United States Patent
Powell

[19]

[11] Patent Number: 5,875,700
[45] Date of Patent: Mar. 2, 1999

[54] BRUSH CUTTING BLADE

[76] Inventor: Robert A. Powell, 1414 NE. 267th Ave., Camas, Wash. 98607

[21] Appl. No.: 971,454

[22] Filed: Nov. 17, 1997

[51] Int. Cl.$^6$ ................................................. A01D 34/82
[52] U.S. Cl. ........................... 83/837; 83/835; 30/276; 30/347; 56/295; 56/DIG. 20
[58] Field of Search ................. 83/837, 835; 30/276, 30/347; 56/255, 295, DIG. 17, DIG. 20

[56] References Cited

U.S. PATENT DOCUMENTS

| Re. 27,647 | 5/1973 | Stair | 56/295 |
|---|---|---|---|
| 149,932 | 4/1874 | Hogeland | 83/837 |
| 2,115,234 | 4/1938 | Preston | 56/295 |
| 2,917,826 | 12/1959 | Pohr | 56/295 |
| 2,976,666 | 3/1961 | Machovec | 56/295 |
| 3,059,400 | 10/1962 | Plummer | 56/295 |
| 3,078,573 | 2/1963 | Kern | 56/295 |
| 3,087,298 | 4/1963 | Phillips | 56/295 |
| 3,299,917 | 1/1967 | Pearson | 83/837 |
| 3,336,737 | 8/1967 | Belfiore | 56/295 |
| 3,338,039 | 8/1967 | Nightingale | 56/295 |
| 3,346,955 | 10/1967 | Beneke | 30/276 |
| 3,482,380 | 12/1969 | Stair | 56/295 |
| 3,781,991 | 1/1974 | Stretton | 30/276 |
| 4,083,166 | 4/1978 | Haas | 56/13.7 |
| 4,250,622 | 2/1981 | Houle | 30/347 |
| 4,300,336 | 11/1981 | Miyata | 56/295 |
| 4,302,878 | 12/1981 | Bonforte | 30/347 |
| 4,310,999 | 1/1982 | Onoue | 56/295 |
| 4,368,610 | 1/1983 | Aono | 56/295 |
| 4,527,382 | 7/1985 | Aono | 56/295 |
| 4,769,977 | 9/1988 | Milbourn | 56/15.2 |
| 4,890,448 | 1/1990 | Doi | 56/255 |
| 4,893,457 | 1/1990 | Castain | 56/295 |
| 4,938,012 | 7/1990 | Klima | 56/295 |
| 4,946,488 | 8/1990 | Davison | 56/14.9 |
| 5,010,649 | 4/1991 | Hoffman | 30/276 |
| 5,056,605 | 10/1991 | Bond | 172/111 |
| 5,063,731 | 11/1991 | Hull et al. | 56/255 |
| 5,167,109 | 12/1992 | Meinerding | 56/295 |
| 5,197,268 | 3/1993 | Barrera | 56/255 |
| 5,361,570 | 11/1994 | Bernardy | 56/255 |
| 5,515,670 | 5/1996 | Meinerding | 56/295 |
| 5,642,609 | 7/1997 | Morrison | 56/295 |

*Primary Examiner*—M. Rachuba
*Assistant Examiner*—Stephen Choi
*Attorney, Agent, or Firm*—Robert L. Harrington

[57] ABSTRACT

A circular brush cutting blade with peripheral cutting teeth. Segments are bent or deflected out of the blade body at an angle to the plane of the blade less than normal. The segments are configured to provide an inclined leading edge for each segment that cuts a laterally extended path with movement of the blade laterally or axially. The segments produced by folding the segments around a base line or juncture with the blade body whereby the opening through the blade created thereby is radially outward of the juncture.

4 Claims, 1 Drawing Sheet

BRUSH CUTTING BLADE

Applicant claims priority under 35 USC §119(a) based on prior filing of a corresponding application in Canada, Serial No. 2,209,054 filed Jul. 28, 1997. A certified copy of this Canadian application has been ordered and will be provided during the prosecution of this application.

FIELD OF THE INVENTION

This invention relates to brush cutting blades and more particularly it relates to a brush cutting blade having dual cutting functions provided by radially extended teeth and axially extended teeth.

BACKGROUND OF THE INVENTION

A circular brush cutting blade is typically a planar disk having its circumference provided with cutting teeth. It is mounted at the end of a long handle with a drive shaft producing rotation of the blade about its axis. Cutting of grass, brush and the like (hereafter collectively referred to as foliage) is achieved with a sweeping motion, e.g., with the blade moved parallel to the ground to cut the brush and grass, etc. close to the ground but spaced above the ground.

Occasionally there is a need to cut into or adjacent the ground, e.g., for total removal of a weed or unwanted plant, and in order to do so with the above conventional brush cutting blade, the blade has to be angled wich is difficult to control and generally unsatisfactory.

A modified brush cutting blade is disclosed in U.S. Pat. No. 5,361,570. The blade provides multiple blade segments at a position inward of the blade's periphery which are formed by being partially severed from the blade body and bent downwardly at right angles from the plane of the blade. A leading edge of the segments is provided with teeth for cutting foliage, e.g., in a digging or mostly up and down motion of the blade but combining both sweeping and vertical motions.

There are two major problems with the blade of the '570 patent. The bent segments provide vertical faces (both inner and outer faces) which tend to push the foliage rather than cut it (in a sweeping motion). Secondly, the segments provide a catch basin, i.e., the material that is cut will be thrown against the flat inner face of the blade segments and cling to the blade. This can cause undesired vibration and interference with the cutting action.

SUMMARY OF THE INVENTION

The present invention obviates the problem of the '570 patent with subtle but very important differences. The segments are formed by cutting along a line that is a cross between a semicircle and two sides of a right triangle (see FIG. 1 of the drawings) sometimes referred to as a curved right angle or half-a-heart shape. The third side of the triangle is a base line that is unsevered and joins the blade body and the segment. The base line is radially inward of the two severed sides. The segments are bent downwardly and inwardly along the base line to about a 45 degree angle from the blade body. An opening in the blade body is thereby formed positioned outwardly of the base line. The longer side of the curved right angle produces an inclined edge that faces the direction of rotation, i.e., it is a leading edge. The edge is provided with cutting teeth.

As will become apparent upon reference to the following detailed description and drawings, the configuration of the segments allows the cutting blade to be moved either laterally or vertically and the laid over teeth of the segments will still cut foliage in the path of movement. Because the segments are laid over at an angle less than 90 degrees, in a radially outward direction, the cut foliage is centrifically thrown outwardly and downwardly by the segments and across the blade opening which avoids jamming of the cut material in the opening.

DETAILED DESCRIPTION

The present invention improves on the device disclosed in U.S. Pat No. 5,361,570 and use of the blade herein is consistent with that of the '570 blade. In general, the blade 10 of the drawings is mounted to a drive shaft at the end of an elongated handle. The center hole 12 of the blade 10 is mounted to the drive shaft and the blade is rotated about the axis defined by said center hole 12.

Figure 2:
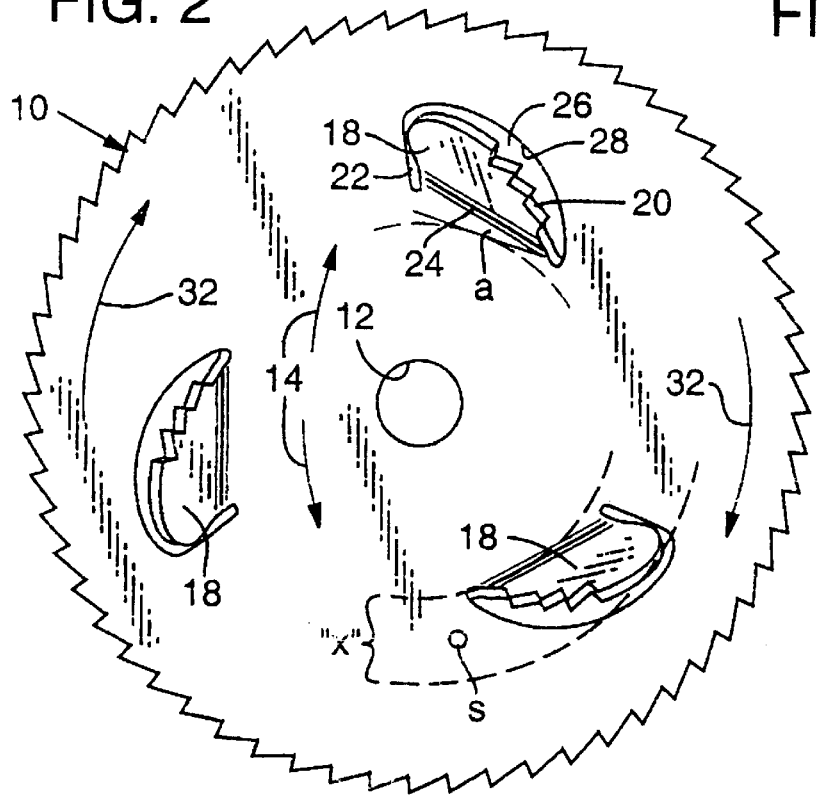
FIG. 2 is a face view of the cutting blade of FIG. 1.
Figure 3:
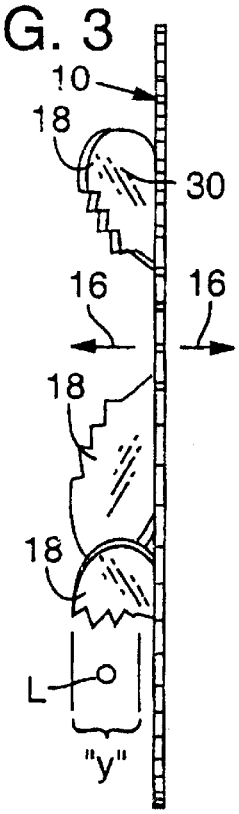
FIG. 3 is an edge view of the cutting blade of FIGS. 1 and 2.

An operator through manipulation of the handle maneuvers the blade 10 oriented parallel to the ground in a traditional lateral sweeping motion indicated by arrows 14 or an up and down motion indicated by arrow 16 or a combination of these movements. It is to be understood that FIG. 2 illustrates the bottom of the blade and FIG. 3 is the side edge of the blade, the right side being the top of the blade and the left side the bottom of the blade.

Figure 1:
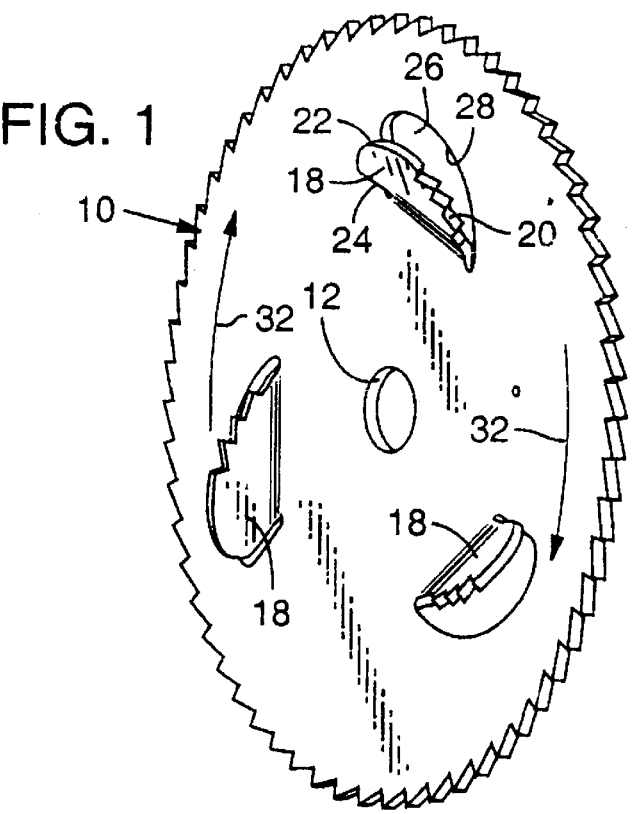
FIG. 1 is a perspective view of a cutting blade of the present invention.

As best illustrated in FIG. 1, there are three symmetrically positioned segments 18 provided in the body of the blade 10. Segments 18 are provided by partially cutting the segments out of the blade body (initially a circular disk) in the shape of a half heart as shown to provide an inclined (but curved) leading edge 20 forming one side of a triangular-like shape, and a near radial (but also curved) second side 22. The third side is not cut and forms an integral juncture 24 with the plate body. The segments are bent downwardly (toward the reader) by an angle that is about 45 degrees from the plate body. This leaves an opening 26 in the blade defined by the pierced edge 28 and the top face 30 of segment 18 (See FIG. 3). The angle is at about 45 degrees but can be less and somewhat more than 45 degrees, e.g., within about 15 degrees to 50 degrees deflection measured from the plane of the plate. A shallower angle is generally preferred, e.g., between 25 degrees and 45 degrees from the body of the plate.

The blade is intended for rotation in the direction indicated by arrows 32. The sloping leading edge 20 is provided with cutting teeth as illustrated and the base line 24 is slanted inwardly toward the center, back to front, defining angle "a" as particularly noted in FIG. 2.

Of primary importance is the fact that the opening 26 is radially outward of juncture 24. It is also important that the angle of bend of the segments is such as to provide a lateral cutting edge whether the brush being cut is oriented normal to the blade body (the lateral dimension indicated as "x" in FIG. 2), or parallel to the blade body (dimension "y" in FIG. 3). For illustration purposes, circle S in FIG. 2 represents the cross section of a standing blade of grass oriented normal to the blade body and circle L in FIG. 3 represents the cross section of a laid over blade of grass substantially parallel to the blade body.

The blade openings 26 being outboard of the segments 18 avoid a problem of grass or brush that is cut by the segments (and being thrown centrifically by the rotation of the blade) having to pass through the openings 26. This is the situation of U.S. Pat. No. 5,361,570 which provides the juncture at the outer edge, e.g., consider junction 24 and edge 28 being reversed and further consider segment 18 bent downwardly to a 90 degree angle with the blade body.

The present invention accordingly provides an important improvement to the structure of the '570 patent as defined in the claims appended hereto.

I claim:

1. A brush cutting blade for mounting to a drive shaft manipulated by a handle, said brush cutting blade comprising:

a circular disk having a disk body defining a plane and having top and bottom sides and a peripheral edge, teeth formed on the peripheral edge and defining a direction of rotation of the disk for cutting, and a center mount for mounting the disk to the drive shaft with the top side facing the handle for rotatively driving the disk in the defined direction of rotation;

at least one cutting segment formed out of the disk body positioned radially outward of the center mount and radially inward of the peripheral edge, said segment having a generally curved triangular shape with three sides, one side being unsevered and forming a juncture with the disk body and the other sides extending from said one side radially outwardly of the center mount severed from the disk body, said segment deflected outwardly of the plane of the disk body toward the bottom side of the disk body at an angled orientation relative to the disk body between positions of co-planar and normal relative to the plane of the disk body and forming thereby an opening through the disk body that is radially outwardly of the juncture;

said segment having an inclined leading edge with cutting teeth on the edge for cutting in the direction of rotation and as a result of the angular orientation of the blades, said teeth presenting a laterally extended cutting section from a face view and a laterally extended cutting section from an edge view of the disk.

2. A brush cutting blade as defined in claim 1 wherein at least three segments are provided in said disk body, and said juncture inclined from trailing end to leading end radially inward.

3. A brush cutting blade as defined in claim 1 wherein multiple segments are provided symmetrically around the disk body, the segments deflected outwardly at a similar angle between 15 degrees and 50 degrees.

4. A brush cutting blade as defined in claim 3 wherein the segments are deflected to an angle of between 25 degrees and 45 degrees.

* * * * *